United States Patent
Yoshida et al.

(10) Patent No.: US 7,312,888 B2
(45) Date of Patent: Dec. 25, 2007

(54) IMAGE FORMATION METHOD AND APPARATUS

(75) Inventors: Minoru Yoshida, Saitama (JP); Takashi Sakayama, Kanagawa (JP); Toshitaka Nakagawa, Saitama (JP); Toshiyu Ishikawa, Kanagawa (JP); Yuichi Shiho, Saitama (JP); Tsuyoshi Watanabe, Saitama (JP); Manabu Hayashi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1047 days.

(21) Appl. No.: 10/397,869

(22) Filed: Mar. 27, 2003

(65) Prior Publication Data

US 2004/0051911 A1    Mar. 18, 2004

(30) Foreign Application Priority Data

Sep. 13, 2002 (JP) ............................. 2002-268465

(51) Int. Cl.
*G06F 3/12* (2006.01)
*G06K 15/00* (2006.01)

(52) U.S. Cl. ..................... 358/1.15; 358/402; 358/1.18

(58) Field of Classification Search ............... 358/1.15, 358/1.18, 1.13, 1.12, 1.9, 1.6, 1.5, 1.2, 1.1, 358/400, 401, 402, 407, 468, 450; 715/500, 715/521, 522, 524, 525, 527; 347/3, 5; 399/1, 399/2

See application file for complete search history.

(56) References Cited

U.S. PATENT DOCUMENTS 6,501,556 B1 * 12/2002 Nishii ...................... 358/1.12
6,608,978 B2 * 8/2003 Robertson et al. ............ 399/82
6,975,419 B2 * 12/2005 Staas et al. ................ 358/1.15

FOREIGN PATENT DOCUMENTS

| CN | 1205824 A | 1/1999 |
| JP | A 6-334835 | 12/1994 |
| JP | A 7-193673 | 7/1995 |
| JP | A 8-223326 | 8/1996 |
| JP | A 8-293996 | 11/1996 |
| JP | 2001-298575 | 10/2001 |
| WO | WO 97/10668 | 3/1997 |

* cited by examiner

*Primary Examiner*—Dov Popovici
(74) *Attorney, Agent, or Firm*—Oliff & Berridge, PLC

(57) ABSTRACT

An image formation apparatus, such as a facsimile machine, outputs a received document (image) in the form of a print. The image formation apparatus includes a receive section and an image formation section. The receive section receives an electronic mail and an attached document thereof over a network. The image formation section forms images of a main body of the electronic mail and the attached document. The images of the main body and the attached document are formed on separate sheets respectively.

38 Claims, 15 Drawing Sheets

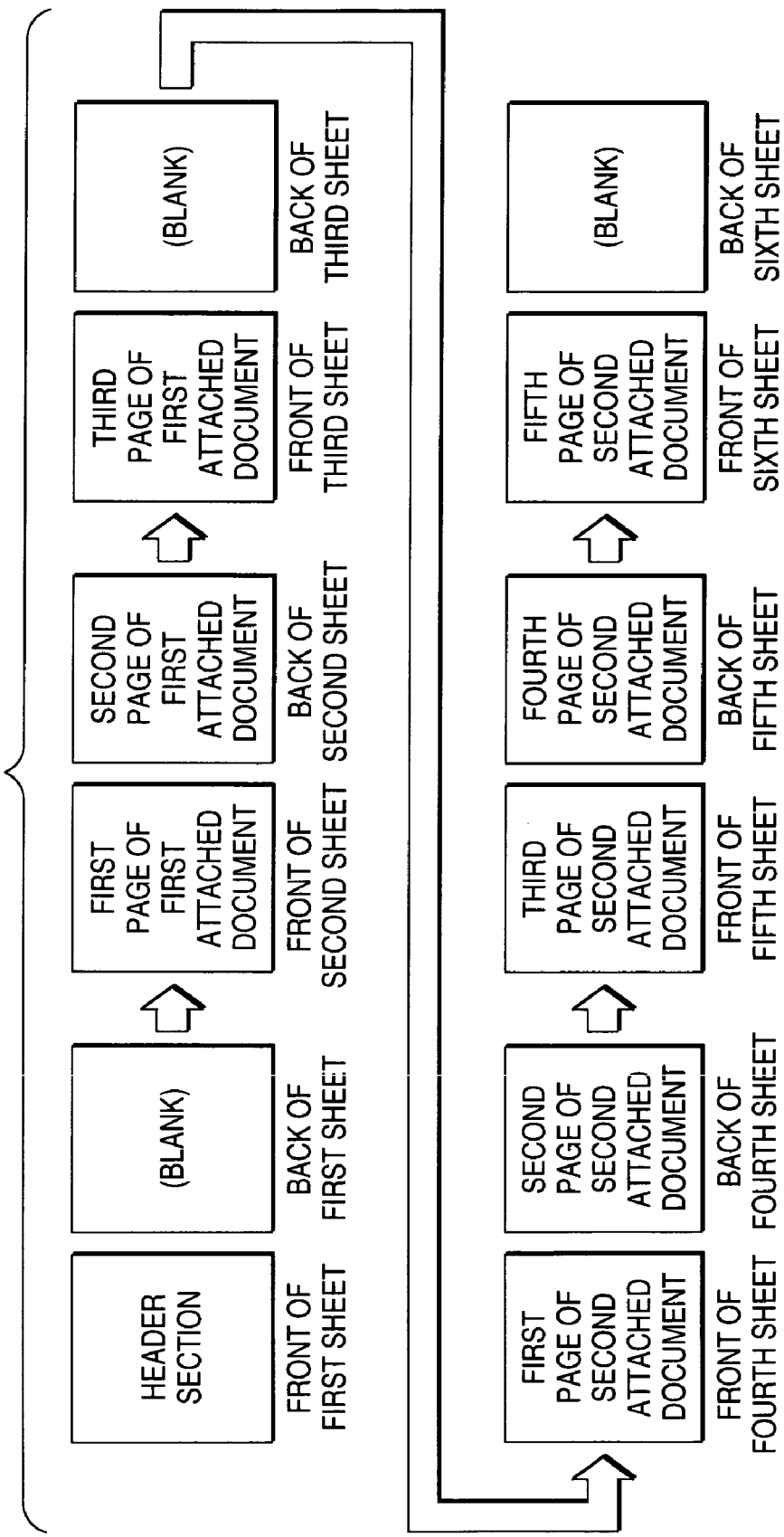

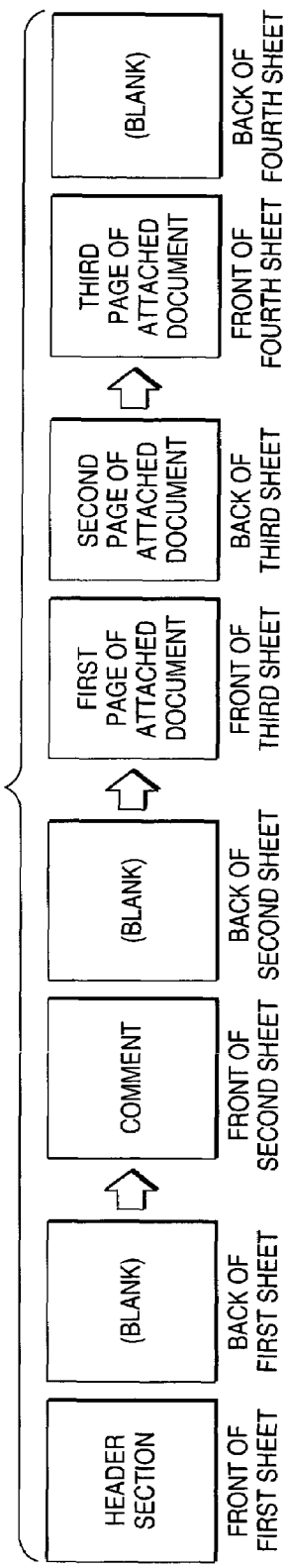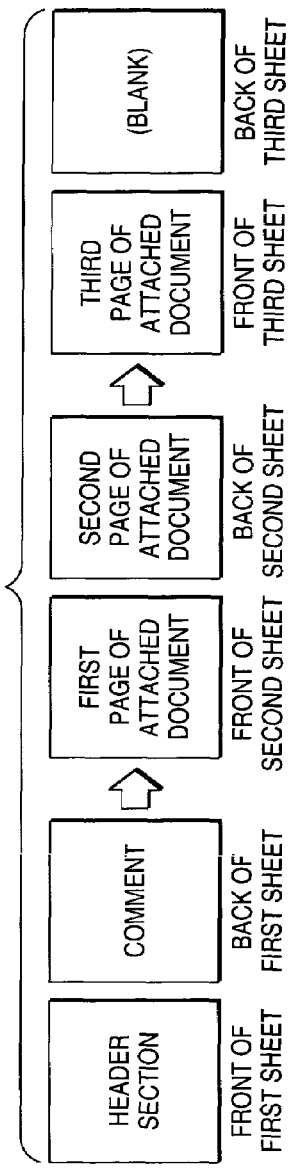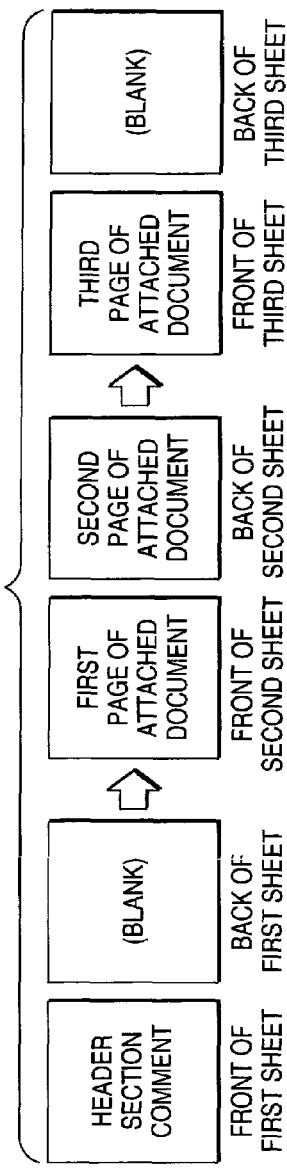

IMAGE FORMATION METHOD AND APPARATUS

BACKGROUND OF THE INVENTION

1. Field of the Invention

The invention relates to a method and apparatus for forming an image, and more particularly, to a method and apparatus for forming an image in which a document received by utilization of an electronic mail is output as a print.

2. Background Art

An image forming apparatus, such as a facsimile machine, outputs a received document (image) in the form of a print. A technique for effecting processing, such as double-sided printing on paper, has hitherto been employed at the time of output of a print.

According to such a technique, a determination is made as to whether or not all of received images assume the same size. If the images assume the same size, the images are to be subjected to double-sided printing. Alternatively, settings may be effected beforehand such that a first page is subjected to single-sided printing and such that second and subsequent pages are subjected to double-sided printing.

In addition, received images may be subjected to double-sided printing.

An Internet facsimile utilizing the Internet has recently become pervasive. The Internet facsimile also performs double-sided printing or the like printing.

SUMMARY OF THE INVENTION

However, the above-described techniques are not intended for determining whether to subject images to single-sided printing or double-sided printing in consideration of contents to be actually printed; that is, whether to subject images to single-sided printing or double-sided printing depending on the size of paper on which images are to be printed or whether to subject images to single-sided printing or double-sided printing in accordance with a preset instruction.

The Internet facsimile usually receives a document in the form of an electronic mail, wherein the electronic mail is formed from a main body and an attached document. The main body of the mail is generally formed from a header and a comment.

Therefore, when paper required for the main body of the mail differs in size from that required for the attached document, a double-sided printing feature becomes inactive, as in the case of the related art. Hence, the main body and the document are subjected to single-sided printing, thus wasting paper.

If the paper for the main body of the mail is identical with that for the attached document, the main body and the attachment maybe subjected to double-sided printing. However, in the case of a user who discards the main body of an electronic mail after having ascertained the same and desires to file only an attached document, if the main body of a mail and an attached document are subjected to double-sided printing, to thereby merge the main body and the document, the user cannot discard the mail while retaining the attached document. As a result, the user must file an unwanted matter, which is inconvenient.

Further, when a plurality of documents are attached to an electronic mail, the documents are subjected to double-sided printing or merged printing despite a desire to print the documents in the form of separate printed matters. For this reason, efforts are expended for producing copies of the documents.

A technique for inhibiting printing of the main body of a mail through user settings has been proposed as a technique for solving the problem. However, in the case of a user who desires to subject the main body of a mail to double-sided printing or merged printing, there is no alternative but to print the main body of the mail, which leads to occurrence of the previously-mentioned waste; or to subject an attached document to double-sided printing or merged printing while effecting such a setting that the main body of he mail is not printed, so as to prevent occurrence of waste, which leads to the impossibility of ascertaining a sender and reading the main body of the mail.

Accordingly, an objective of the invention is to provide a method and apparatus for forming an image, in which a document received as an electronic mail can be appropriately subjected to processing, such as double-sided printing.

To achieve the object, the invention provides an image formation method, including: receiving an electronic mail and an attached document thereof over a network; and forming images of a main body of the electronic mail and the attached document; wherein the images of the main body and the attached document are formed on separate sheets respectively.

Preferably, the forming step employs duplexing image formation.

Preferably, in the forming step, a predetermined number of pages are formed as an image on at least one surface of a sheet.

The invention further provides an image formation method, including: receiving an electronic mail and an attached document thereof over a network; generating an image formation job including a code showing a breakpoint between a main body of the electronic mail and the attached document; and forming images of the main body and the attached document on separate sheets on the basis of the image formation job.

The invention further provides an image formation method, including: receiving an electronic mail and an attached document thereof over a network; generating image formation jobs each corresponding to a main body of the electronic mail and the attached document; and forming images of the main body and the attached document on the basis of the image formation jobs on separate sheets respectively.

The image formation method may include: determining a setting as to whether to form the image of the main body and that of the attached document on separate sheets or the same sheet. The images are formed in accordance with the setting.

The image formation method may include: the determining step includes determining the setting on the basis of sender identification information pertaining to the electronic mail.

The invention further provides an image formation method, including: receiving an electronic mail and a plurality of attached documents thereof over a network; and forming each image of the attached documents to sheets separatively.

The invention further provides an image formation method, including: receiving an electronic mail and an attached document thereof over a network; and forming images of a main body of the electronic mail and the attached document independently.

Preferably, in the forming step, each image of the main body of the electronic mail and the attached document is formed in accordance with different image formation methods.

Preferably, the forming step includes: forming the image of the main body of the electronic mail on one surface of a sheet; and forming the image of the attached document on both surfaces of a sheet.

Preferably, the forming step includes: forming the image of the main body of the electronic mail on both surfaces of a sheet; and forming the image of the attached document on one surface of a sheet.

Preferably, the forming step includes: forming an image of each page of the main body of the electronic mail at least one surface of a sheet; and forming an image of a predetermined number of pages of the attached document on at least one surface of a sheet.

Preferably, the forming step includes forming an image of a predetermined number of pages of the main body of the electronic mail on at least one surface of a sheet; and forming an image of each page of the attached document on at least one surface of a sheet.

The invention further provides an image formation apparatus, including: a receive section which receives an electronic mail and an attached document thereof over a network; and an image formation section which forms images of a main body of the electronic mail and the attached document; wherein the images of the main body and the attached document are formed on separate sheets respectively.

Preferably, the image formation section forms images of the main body of the electronic mail and the attached document by duplexing image formation.

Preferably, the image formation section forms images of the main body of the electronic mail and the attached document while forming a predetermined number of pages as an image on at least one surface of a sheet.

The invention further provides an image formation apparatus, including: a receive section which receives an electronic mail and an attached document thereof over a network; an image formation section which forms an image of a main body of the electronic mail and the attached document; and a job generation section which produces an image formation job including a code showing a breakpoint between a main body of the electronic mail and the attached document; wherein the image formation section forms the images of the main body and the attached document on separate sheets on the basis of the image formation job.

The invention further provides an image formation apparatus, including: a receive section which receives an electronic mail and an attached document thereof over a network; a job generation section which produces image formation jobs each corresponding to a main body of the electronic mail and the attached document; and an image formation section which forms the image of the main body and the attached document on the basis of the image formation jobs on separate sheets respectively.

The image formation apparatus may include a setting section which determines a setting as to whether to form the image of the main body and that of the attached document on separate sheets or the same sheet. The image formation section forms the images in accordance with the setting.

The image formation apparatus may include the setting section determines the setting on the basis of sender identification information pertaining to the electronic mail.

The invention further provides an image formation apparatus, including: a receive section which receives an electronic mail and a plurality of attached documents thereof over a network; and an image formation section which forms each image of the plurality of the attached documents to sheets separatively.

The invention further provides an image formation apparatus, including: a receive section which receives an electronic mail and an attached document thereof over a network; and an image formation section which forms images of a main body of the electronic mail and the attached document independently.

Preferably, the image formation section forms each image of the main body of the electronic mail and the attached document in accordance with different image formation methods.

Preferably, the image formation section forms an image of the main body of the electronic mail on both surfaces of a sheet and forms an image of the attached document on one surface of a sheet.

Preferably, the image forming section forms an image of the main body of the electronic mail on both surfaces of a sheet, and forms an image of the attached document on one surface of a sheet.

Preferably, the image formation section forms an image of each page of the main body of the electronic mail at least one surface of a sheet and forms an image of a predetermined number of pages of the attached document on at least one surface of a sheet.

Preferably, the image formation section forms an image of a predetermined number of pages of the main body of the electronic mail on at least one surface of a sheet and forms an image of each page of the attached document on at least one surface of a sheet.

BRIEF DESCRIPTION OF THE DRAWINGS

The present invention may be more readily described with reference to the accompanying drawings:

FIG. 6 is a view 2 showing example outputs from the image formation apparatus;

FIGS. 7A-C are views 3 showing example outputs from the image formation apparatus;

DETAILED DESCRIPTION OF THE PREFERRED EMBODIMENTS

An embodiment of a method and apparatus for forming an image according to the invention will be described in detail hereinbelow by reference to the accompanying drawings.

Figure 1:
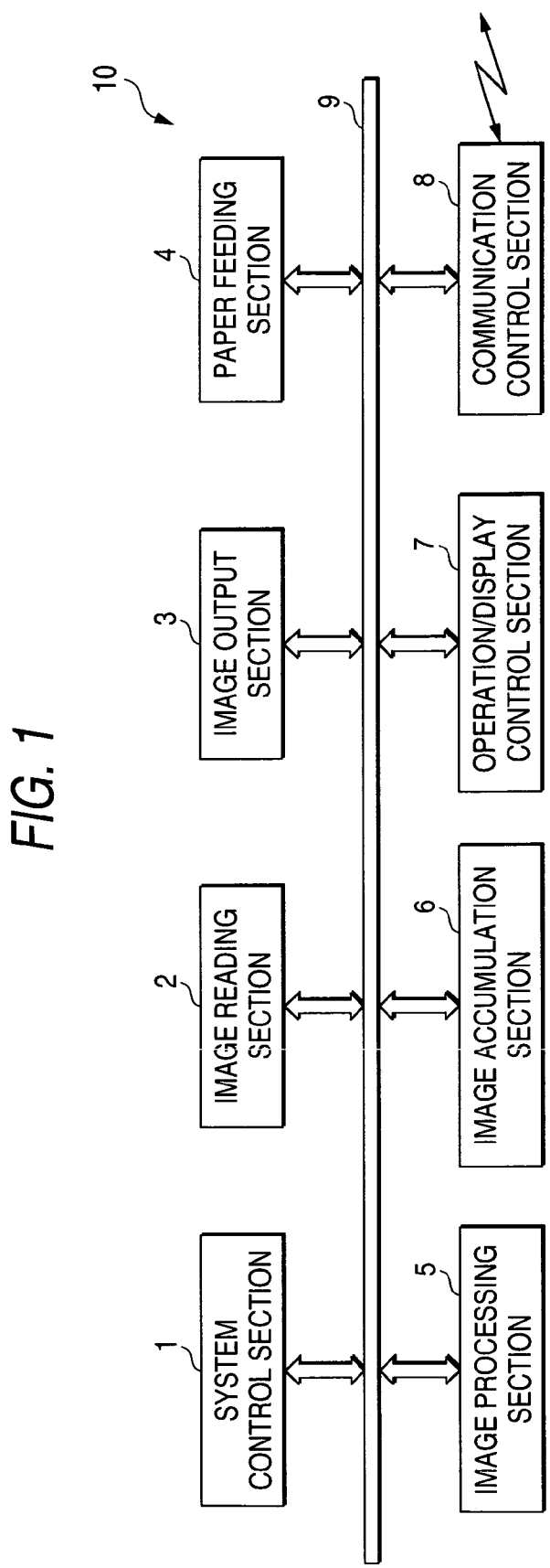
FIG. 1 is a block diagram showing the outline of an example configuration of an image formation apparatus to which the invention is applied.

FIG. 1 is a block diagram showing the outline of exemplary configuration of an image forming apparatus to which the invention is applied. As illustrated, an image forming apparatus 10 comprises a system control section 1, an image reading section 2, an image output section 3, a paper feeding section 4, an image processing section 5, an image accumulation section 6, an operation/display control section 7, a communication control section 8, and a system bus 9.

The system control section 1 controls the entirety of the image forming apparatus 10 and is formed from, e.g., a processor, a program for activating the processor, or memory. The image reading section 2 acquires image data by reading an original. The image output section 3 forms an image on paper on the basis of image data and outputs the image in the form of a print. The paper feeding section 4 has a plurality of paper feeding trays. When the image output section 3 forms an image, the paper feeding section 4 feeds paper from the paper feeding trays. The image processing section 5 subjects image data to various image processing operations, such as encoding, decoding, enlargement, or reduction. Thus, the image processing section 5 decodes and converts the main body of an electronic mail or an attached document into image data. The image accumulation section 6 temporarily stores and accumulates image data. The operation/display control section 7 receives an operation instruction from a user and supplies various information items to the user. The communication control section 8 controls connection and communication to a network, such as a LAN or the Internet. These individual sections are connected together by way of the system bus 9 and exchange signals and data.

Figure 2:
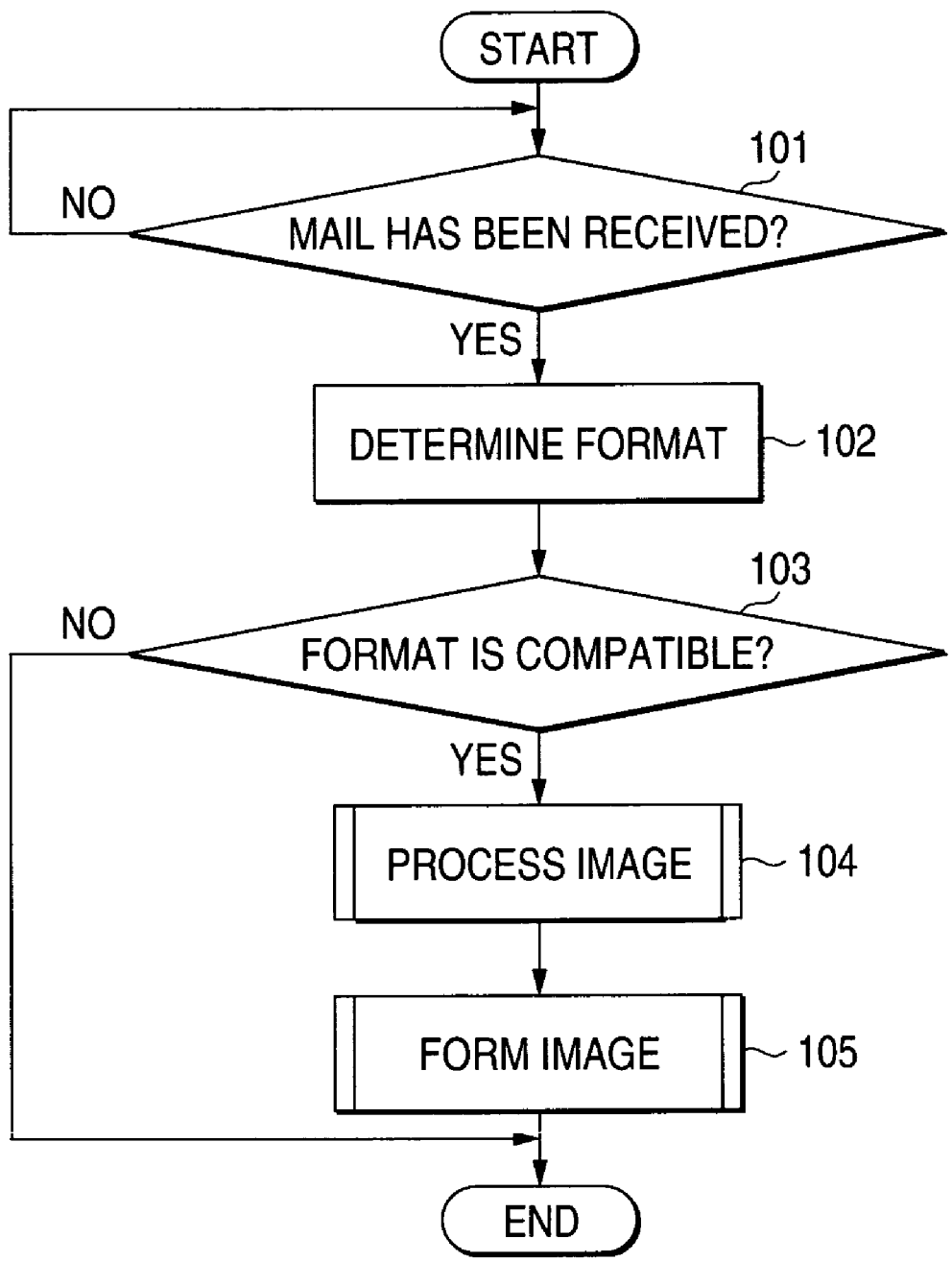
FIG. 2 is a flowchart showing flow of operation of an image formation apparatus according to the invention.

Operation of the image forming apparatus 10 will now be described. FIG. 2 is a flowchart showing flow of operation to be performed by the image forming apparatus 10.

In the image forming apparatus 10, the communication control section 8 periodically ascertains receipt of an electronic mail by accessing a mail server (not shown) connected to a network (when NO is selected in step 101). If periodic ascertainment shows that an electronic mail has been received (when YES is selected in step 101), the format of a received electronic mail is determined (step 102).

The system control section 1 determines the format of a received electronic mail; that is, the format of a main body and that of an attached document. If the electronic mail complies with an MIME form, the format of the mail is determined in accordance with descriptions of "Content-type" such as "Content-type:text/plain; char-set=iso-2022-jp," "Content-transfer-encoding: 7 bit," "Content-type: image/tiff," and "Content-transfer-encoding: base64." Moreover, in the case of an electronic mail of another form, the format of the mail is determined in the same manner in compliance with the form.

If a result of determination of a format shows that the format is a compatible format (when YES is selected in step 103), the image processing section 5 performs image processing operation to be described later (step 104). A result of image processing is accumulated in the image accumulation section 6. The image output section 3 performs an image forming operation to be described later (step 105), and processing is terminated.

If a result of determination of a format shows that the format is other than a compatible format (when NO is selected in step 103), processing is terminated in its present state.

Figure 3:
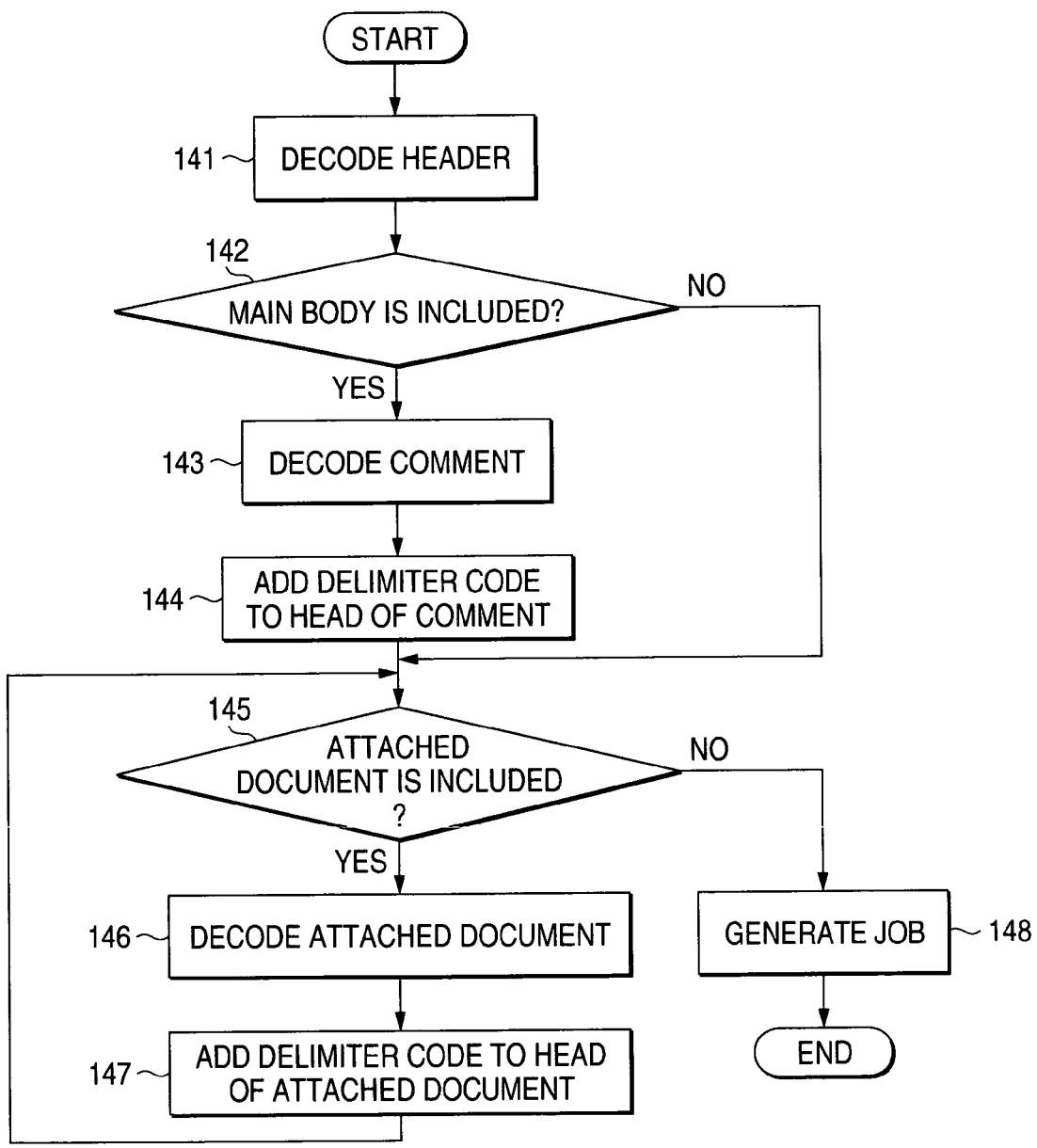
FIG. 3 is a flowchart showing flow of image processing.

Image processing pertaining to step 104 will now be described. FIG. 3 is a flowchart showing flow of image processing.

The image processing section 5 initiates image processing. First, the image processing section 5 decodes a header section of the main body of a received electronic mail (step 141). Then, if a comment is described in the main body of the received electronic mail (when YES is selected in step 142), the comment is decoded (step 143), and a delimiter code is added to the head of the thus-decoded comment (step 144).

Subsequently, if the received electronic mail has an attached document (when YES is selected in step 145), the document is decoded (step 146), and a delimiter is added to the head of the thus-decoded attached document (step 147).

If a plurality of documents are attached to the received electronic mail, similar processing is iterated (when YES is selected in step 145). When decoding of all the attached documents has been completed (when NO is selected in step 145), print jobs are prepared on the basis of the thus-decoded main bodies (step 148), and the image processing is terminated.

Figure 4:
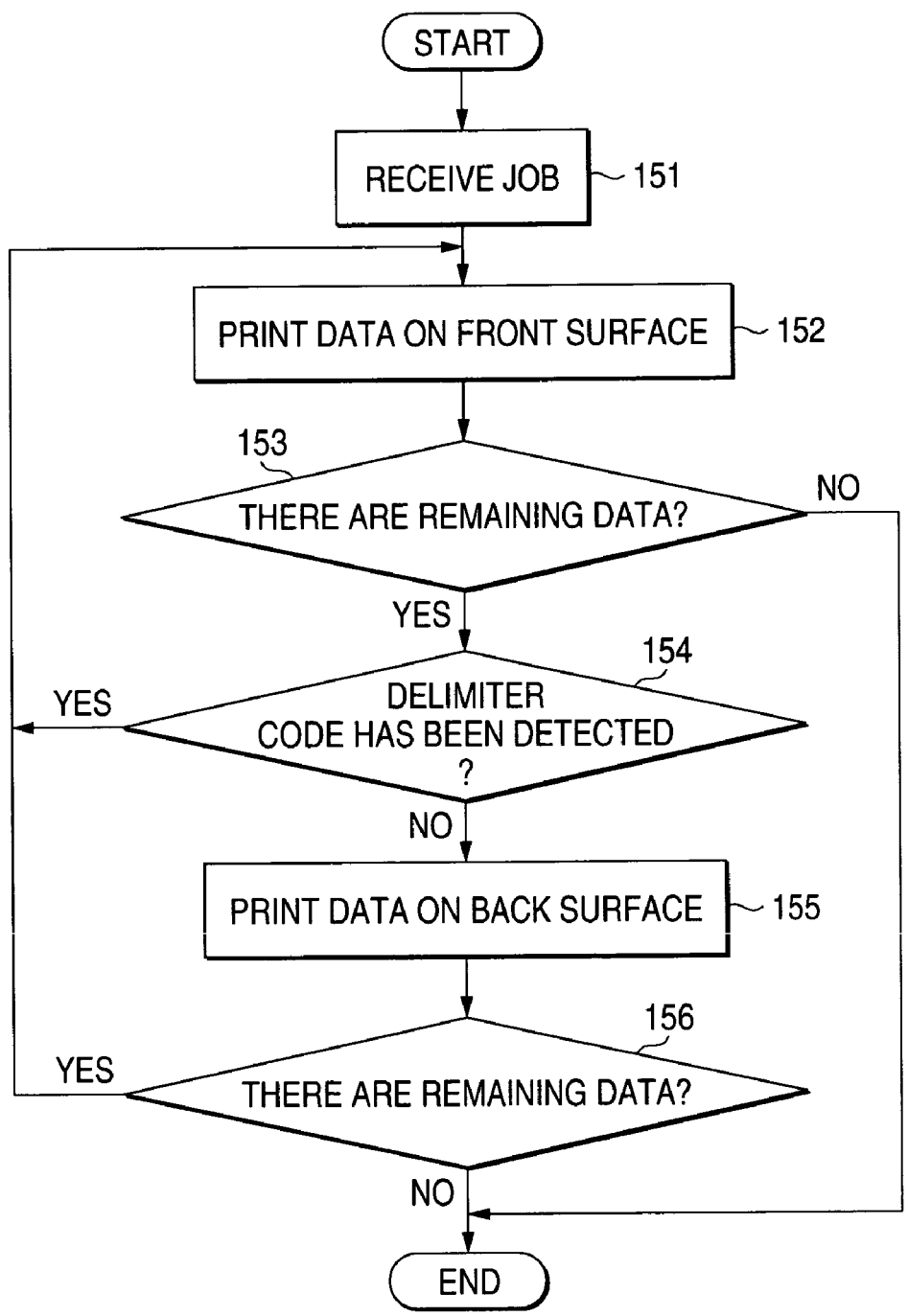
FIG. 4 is a flowchart showing flow of image formation processing.

Image formation processing pertaining to step 105 will now be described. FIG. 4 is a flowchart showing flow of image formation processing.

Upon receipt of the print jobs prepared by the image processing section 5 (step 151), the image output section 3 effects printing of print data on the surface of paper in accordance with the print jobs (step 152).

If print data still remain to be printed (when YES is selected in step 153), processing is continued. When a delimiter code is detected from the remaining data (when YES is selected in step 154), data are printed on the surface of the next sheet (step 152).

If a delimiter code is not detected from the remaining data (when NO is selected in step 154), data are printed on the back of the paper that has been subjected to printing immediately before (step 155). If print data still remain to be printed (when YES is selected in step 156), the data are printed on the surface of the next paper (step 152).

When all data to be printed are printed through repetition of such processing (when NO is selected in step 153 or NO is selected in step 156), the image formation processing is completed.

Figure 5:
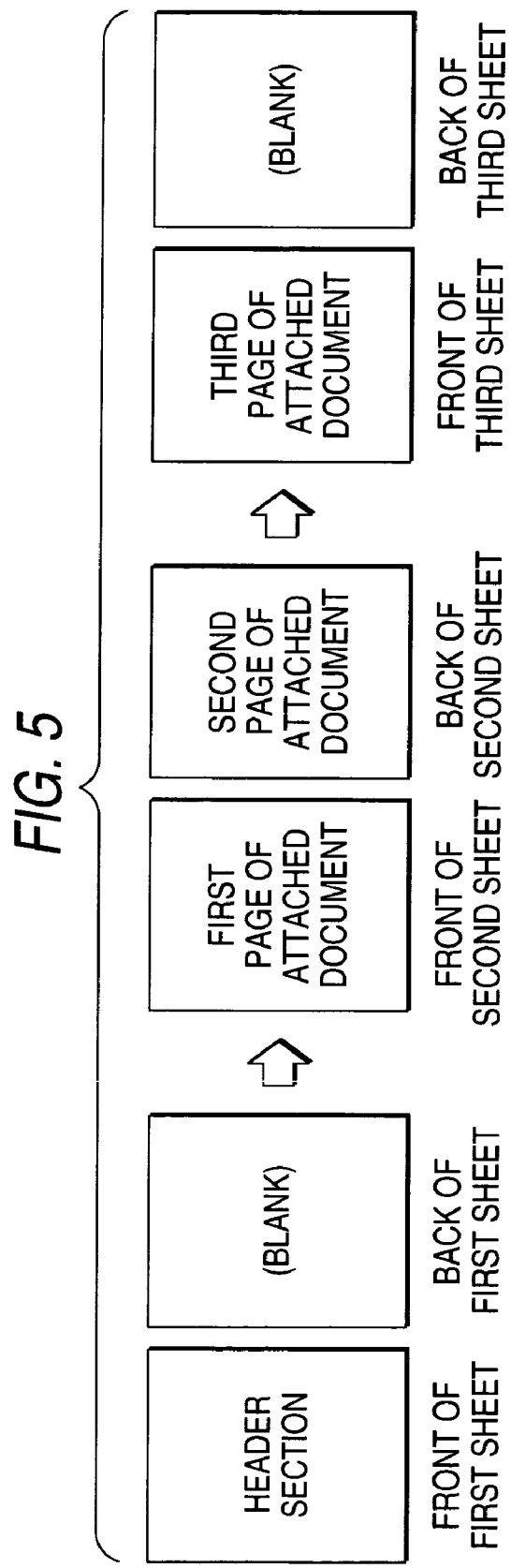
FIG. 5 is a view 1 showing example outputs from the image formation apparatus.

Next, several example outputs produced through the foregoing processing will be described. FIGS. 5 through 7 show example outputs produced by the image formation apparatus 10.

When having received an electronic mail having no description of comments and an attached document of 3 pages, the image formation apparatus 10 produces print outputs such as those shown in FIG. 5. In this case, details of a header are printed on the front surface of a first sheet, and the back surface of the same sheet is left blank. A first page of the attached document is printed on the front surface of a second sheet, and a second page of the attached document is printed on the back surface of the same. A third page of the attached document is printed on the front surface of a third sheet, and the back surface of the same is left blank.

When having received an electronic mail which has no description of a comment, an attached document of 3 pages, and another attached document of 5 pages, the image formation apparatus 10 produces print outputs such as those shown in FIG. 6. In this case, details of a header are printed on the front surface of a first sheet, and the back surface of the same sheet is left blank. A first page of an attached document 1 is printed on the front surface of a second sheet, and a second page of the attached document 1 is printed on the back surface of the same sheet. A third page of the attached document 1 is printed on the front surface of a third sheet, and the back surface of the same sheet is left blank.

A first page of an attached document 2 is printed on the front surface of a fourth sheet, and a second page of the attached document 2 is printed on the back surface of the same sheet. A third page of the attached document 2 is printed on the front surface of a fifth sheet, and a fourth page of the attached document 2 is printed on the back surface of the same sheet. A fifth page of the attached document 2 is printed on the front surface of a sixth sheet, and the back surface of the same sheet is left blank.

When having received an electronic mail having a description of a comment and an attached document of three pages, the image formation apparatus 10 produces print outputs such as those shown in FIG. 7.

FIG. 7A shows a case where a comment is printed on paper independent from that on which a header is printed. Details of a comment are printed on the front surface of a first sheet, and the back surface of the first sheet is left blank. A comment is printed on the front surface of a second sheet, and the back surface of the second sheet is left blank. A first page of an attached document is printed on the front surface of a third sheet, and a second page of the attached document is printed on the back surface of the third sheet. A third page of the attached document is printed on the front surface of a fourth sheet, and the back surface of the fourth sheet is left blank.

FIG. 7B shows a case where a comment is printed on the same sheet as that on which the header is printed. Details of a header are printed on the front surface of the first sheet, and details of a comment are printed on the back of the first sheet. A first page of an attached document is printed on the front surface of a second sheet, and a second page of the attached document is printed on the back surface of the second sheet. A third page of the attached document is printed on the front surface of a third sheet, and the back surface of the third sheet is left blank.

FIG. 7C shows a case where a header and a comment are printed on one side of a single sheet without insertion of a delimiter between the header and the comment; that is, a case where a main body is printed without separation. Details of a header and those of a comment are printed on the front surface of a first sheet, and the back surface of the first sheet is left blank. A first page of an attached document is printed on the front surface of a second sheet, and a second page of the attached document is printed on the back surface of the second sheet. A third page of the attached document is printed on the front surface of a third sheet, and the back surface of the third sheet is left blank.

A main body is printed on one surface of a sheet, and an attached document is printed on both surfaces of respective sheets, thereby reducing the number of sheets required for printing the attached document.

A main body is printed on both surfaces of respective sheets, and an attached document is printed on single surfaces of respective sheets, thereby reducing the number of sheets required for printing the main body.

Whether to print a header and a comment on a single sheet or respective independent sheets can be set beforehand. Settings can usually be effected such that a header and a comment are printed on a single sheet and such that a comment is printed on an independent sheet only when the comment exceeds one page (in this case the back surface of the second sheet shown in FIG. 7A is taken as a second page of a comment).

Whether to print a main body and an attached document on a single sheet or respective independent sheets can be set beforehand.

Such settings are registered beforehand for respective names of senders of electronic mails. As a result, when an electronic mail is received, printing can be effected on the basis of the name of the sender of the mail and in agreement with settings for that sender; that is, whether to print the mail on a single sheet or on independent sheets.

Processing pertaining to double-sided printing of a received electronic mail has been described thus far. A received electronic mail can be similarly subjected to printing other than double-sided printing; for example, so-called N-up printing in which N pages are merged into a single page.

Figure 8:
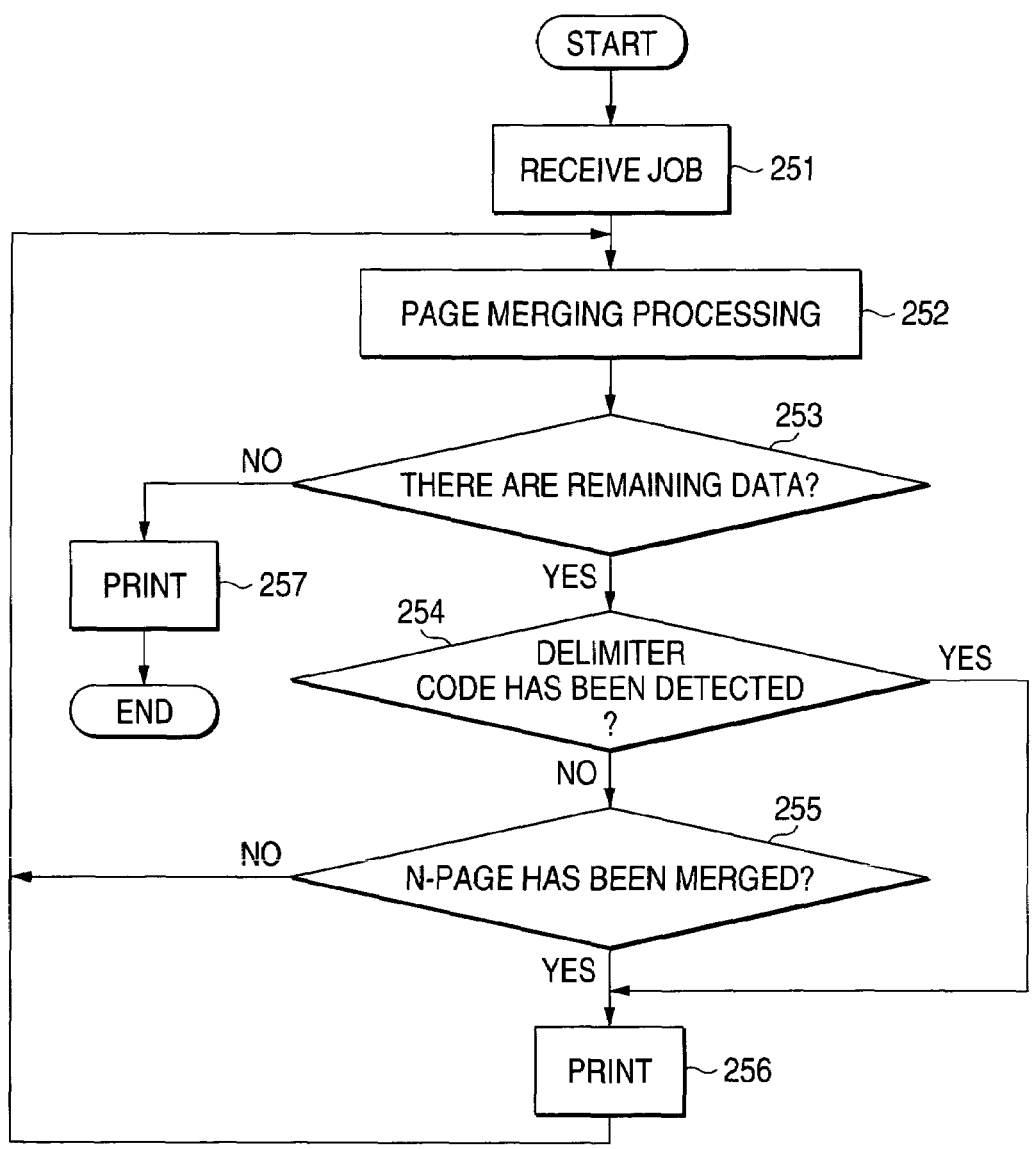
FIG. 8 is a flowchart showing flow of image formation processing required when merged printing is performed.

When merged printing is performed, processing pertaining to step 105 is modified. For instance, processing described below is performed. FIG. 8 is a flowchart showing flow of image formation processing carried out when merged printing is performed.

Upon receipt of a print job produced by the image processing section 5 (step 251), the image output section 3 subjects the first page to merging operation in accordance with the print job (step 252). During page merging operation, an object page is reduced, and layout of the page to another, new page is performed. When the page merging operation is completed, a delimiter code is detected if data to be printed still remain (when YES is selected in step 253). Further, page merging operation is similarly iterated (step 252) until merging of N pages is performed (when NO is selected in steps 254 and 255).

When data to be printed still remain and a delimiter code has been detected (when YES is selected in step 254) or when merging of N pages has been completed (when YES is selected instep 255), the pages that have already been merged are printed (step 256), and remaining data to be printed are subjected to merging operation (step 252).

When no data to be printed still remain (when NO is selected in step 253), currently-merged pages are printed (step 257), thereby terminating image formation processing.

Figure 9:
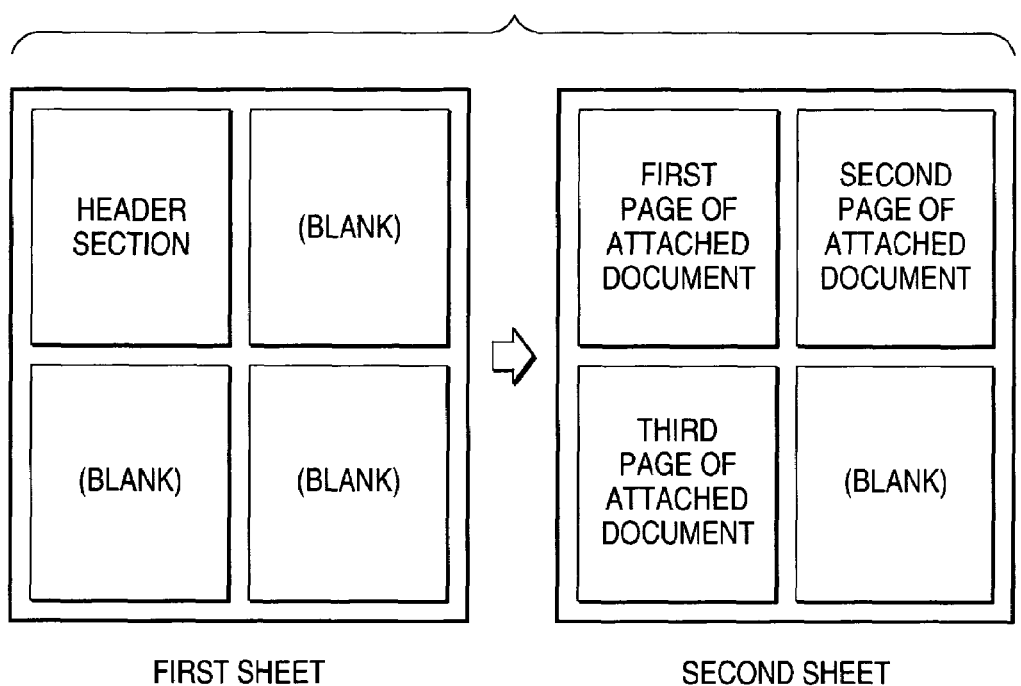
FIG. 9 is a view 4 showing example outputs from the image formation apparatus.
Figure 10:
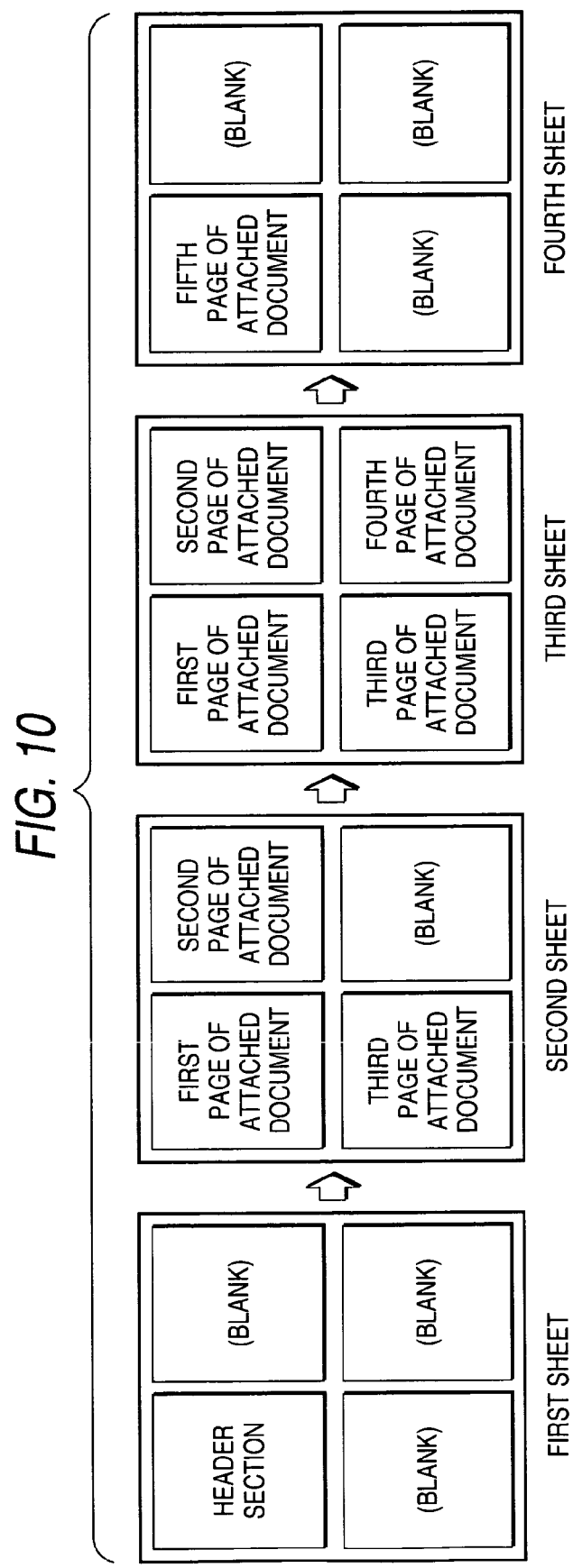
FIG. 10 is a view 5 showing example outputs from the image formation apparatus.
Figure 11:
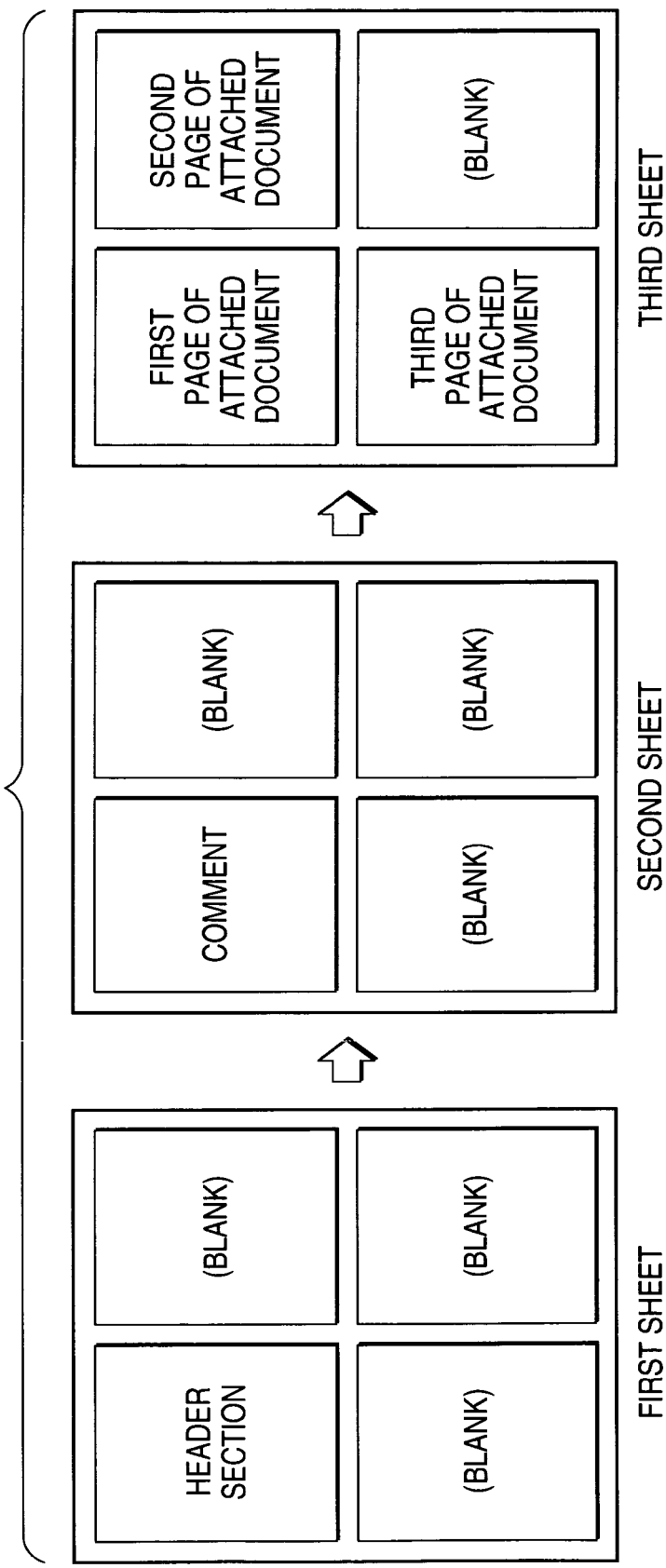
FIG. 11 is a view 6 showing example outputs from the image formation apparatus.

Subsequently, several example output results produced through the foregoing merging printing operation will be described. FIGS. 9 through 11 are views showing example outputs produced by the image formation apparatus 10 when four-up (N=4) merged printing operation is to be performed.

When having received an electronic mail having no description of a comment and an attached document of 3 pages, the image formation apparatus 10 produces print outputs such as those shown in FIG. 9. In this case, details of a header are printed on a field of a first sheet corresponding to one page, and remaining fields corresponding to three pages are left blank. First through third pages of the attached document; that is, all three pages of the attached document, are printed on the second sheet. A remaining field corresponding to one page is left blank.

When having received an electronic mail having no description of a comment, an attached document of 3 pages, and another document of 5 pages, the image formation apparatus 10 produces print outputs such as those shown in FIG. 10. In this case, details of a header are printed on a field of a first sheet corresponding to one page, and remaining fields corresponding to three pages are left blank. First through third pages of an attached document 1; that is, all three pages of an attached document 1, are printed on a second sheet, and a remaining field corresponding to one page is left blank. First through fourth pages of an attached document 2 are printed on a third sheet, and a fifth page of the attached document 2 is printed on a fourth sheet. However, remaining fields of the fourth page corresponding to three sheets are left blank.

When having received an electronic mail having a description of a comment and an attached document of 3 pages, the image formation apparatus 10 produces print outputs such as those shown in FIG. 11. In this case, details of a header are printed on a field of a first sheet corresponding to one page, and remaining fields corresponding to three pages are left blank. Details of a comment are printed on a field of a second sheet corresponding to one page, and remaining fields corresponding to three pages are left blank. First through third pages of an attached document; that is, all three pages of the attached document, are printed on a third sheet, and a remaining field corresponding to one page is left blank. Here, it is not always the case that the header and the comment must be printed on respective independent sheets.

The header and the comment can be printed on a single sheet; that is, without separation of a main body.

The number of sheets required for printing an attached document can be reduced by printing a main body on a field corresponding to one page on at least one surface of a sheet and printing an attached document in the form of an N-up layout.

The number of sheets required for printing a main body can be reduced by printing the main body in an N-up layout and an attached document on a field corresponding to one page on at least one surface of the sheet.

A main body and an attached document are separated from each other during the foregoing image processing by utilization of a delimiter code. Similar processing can be performed by taking a main body and an attached document as independent jobs instead of utilizing the delimiter code.

Figure 12:
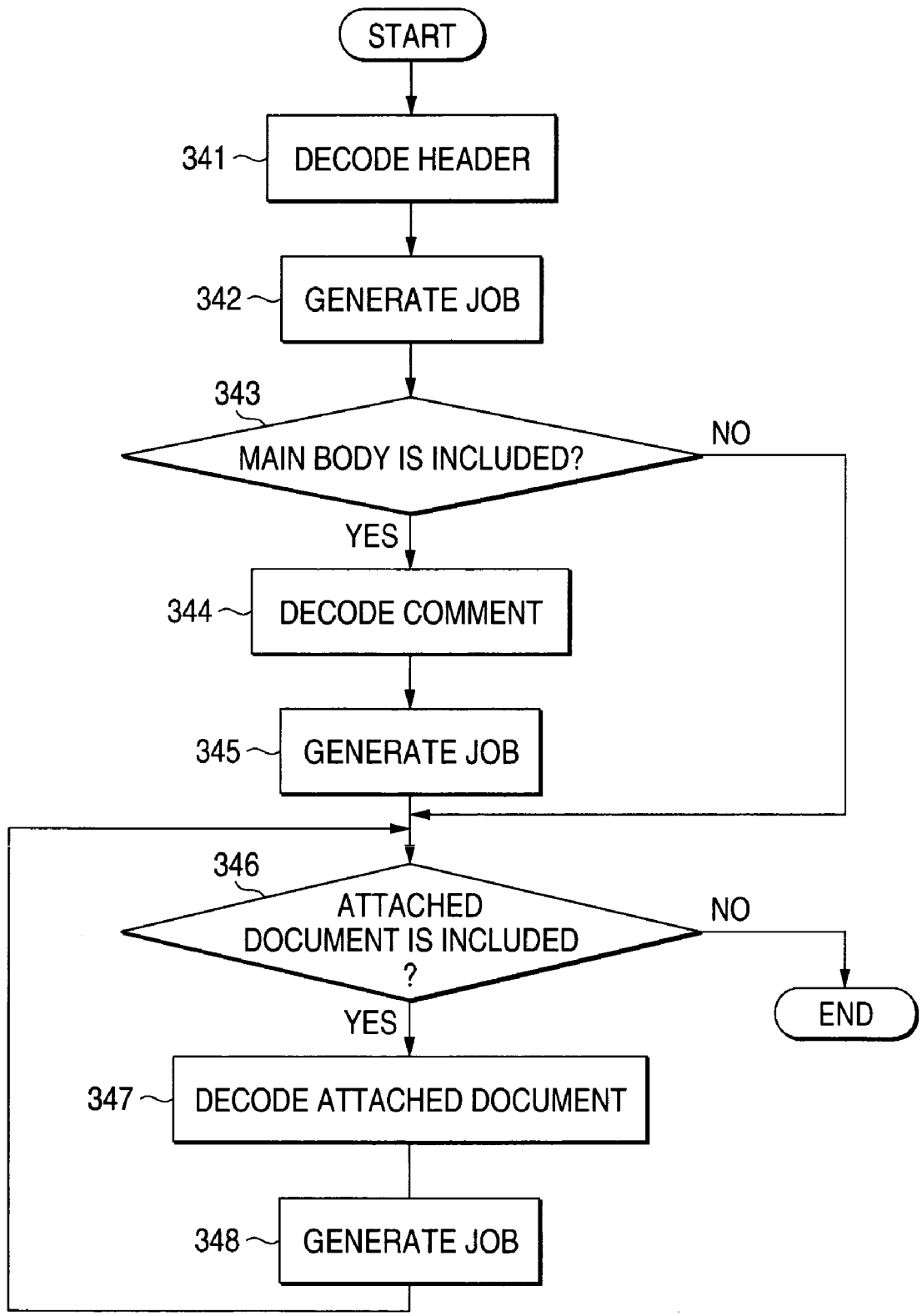
FIG. 12 is a flowchart showing flow of image processing required at the time of preparation of an independent job.

When the main body and the attached document are taken as independent jobs, processing pertaining to step 104 is modified. For instance, processing described below is performed. FIG. 12 is a flowchart showing flow of image processing when independent jobs are generated.

When commencing image processing, the image processing section 5 decodes a header of a main body of a received electronic mail (step 341). A print job is produced from a decoded header (step 342).

Subsequently, when a comment is described in the main body of the received electronic mail (when YES is selected in step 343), the comment is decoded (step 344). A print jobs is produced from the decoded comment (step 345). When a comment is not described in the received electronic mail (when NO is selected in step 343), the comment is not subjected to processing.

If a received electronic mail is provided with an attached document (when YES is selected in step 346), the attached document is decoded (step 347), and a print job is produced from the thus-decoded attached document (step 348).

When the received electronic mail has a plurality of attached documents, similar processing is iterated (when YES is selected in step 346), and when decoding of all the attached documents and generation of jobs are completed (when NO is selected in step 346), image processing is terminated.

When the image processing such as that shown in FIG. 12 has been performed in step 104, image formation processing pertaining to step 105 becomes identical with the related-art processing.

Figure 13:
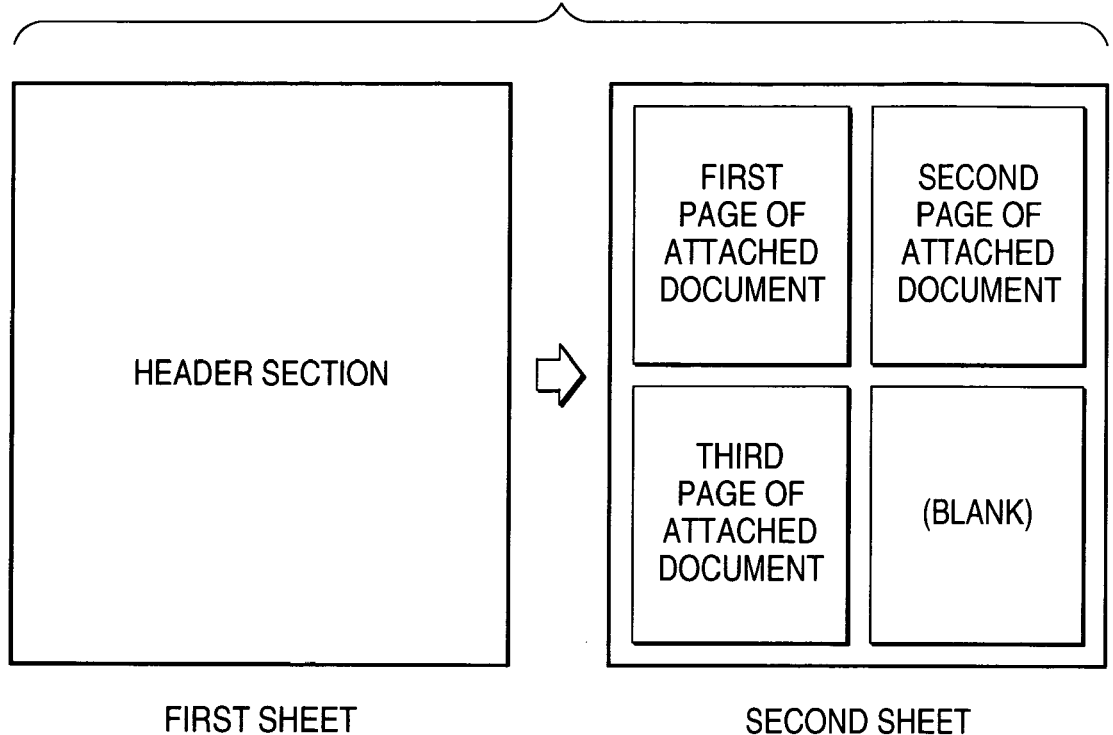
FIG. 13 is a view 7 showing example outputs from the image formation apparatus.
Figure 14:
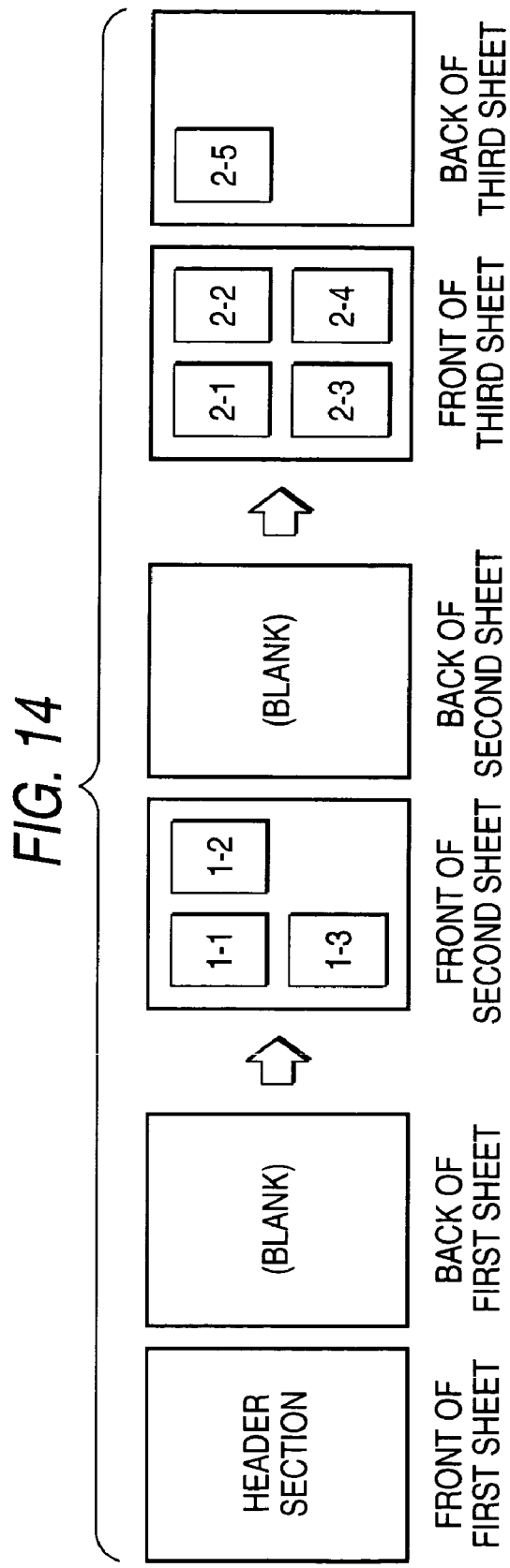
FIG. 14 is a view 8 showing example outputs from the image formation apparatus.
Figure 15:
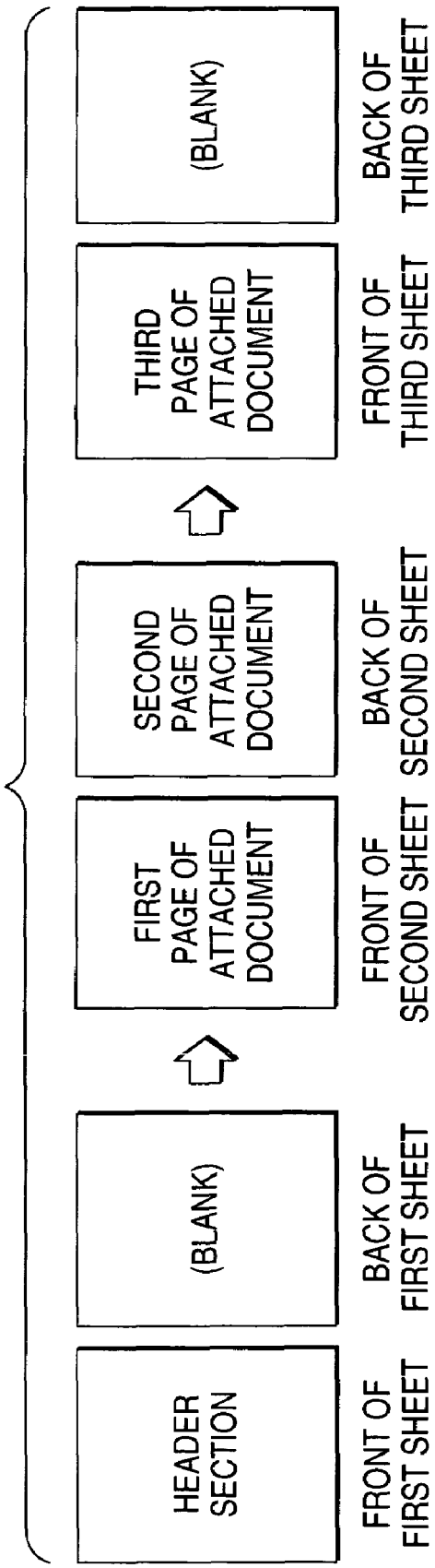
FIG. 15 is a view 9 showing example outputs from the image formation apparatus.

Finally, several example outputs produced by the image formation apparatus 10 other than those described above will now be described. FIGS. 13 through 15 are views showing example outputs from the image output apparatus 10.

An example shown in FIG. 13 relates to a case where N-up printing is to be performed. Details of a header and those of a comment are printed without execution of N-up operation. Details of the header are printed on a first sheet while being assigned to a field corresponding to one page. Details of an attached document are printed on a second sheet while being assigned to an N-up layout.

An example shown in FIG. 14 relates to a case where N-up printing and double-sided printing are performed and where details of a header and those of a comment are printed normally. In this case, details of a header are printed on the front surface of a first sheet, and the back surface of the first sheet is left blank. All pages of an attached document 1 having 3 pages are printed on the front surface of a second sheet, and the back surface of the second sheet is left blank. First through fourth pages of an attached document 2 having 5 pages are printed on the front surface of a third sheet, and a fifth page of the attached document 2 is printed on the back surface of the third sheet.

An example shown in FIG. 15 relates to a case where double-sided printing is performed, as in the case illustrated in FIG. 5, and shows a first sheet on which a header is to be printed is different from second and third sheets on which an attached document is to be printed. In this case, print paper is changed at every delimiter code (as in the case of the processing shown in FIG. 8) and different print paper is set for each print job to be produced (as in the case of the processing shown in FIG. 12).

In addition, printing conditions can be changed on a per-header basis, a per-comment basis, or a per-attached-document basis, as required.

As has been described, according to the invention, printing is performed such that paper on which a document attached to an electronic mail is to be printed is separated from paper on which a main body is to be printed. Hence, even when double-sided printing or N-up printing is performed, an attached document can be saved independently. The attached document can be filed without having to file the header of the mail.

Further, double-sided printing of the header and the attached document can be ensured even when a paper size required for printing a header differs from that required for printing an attached document.

What is claimed is:

1. An image formation method, comprising:
   receiving an electronic mail and an attached document thereof over a network; and
   forming images of a main body of the electronic mail and the attached document;
   wherein
   the images of the main body and the attached document are formed on separate sheets respectively;
   after receiving the electronic mail, one print job is generated while decoding the received electronic mail;
   when generating the one print job, a delimiter is added in the print job; and
   when the delimiter is detected while executing the one print job, the sheet on which data is printed is changed.

2. The image formation method according to claim 1, wherein the forming step employs duplexing image formation.

3. The image formation method according to claim 1, wherein in the forming step, a predetermined number of pages are formed as an image on at least one surface of a sheet.

4. The method of claim 1, wherein upon detecting the delimiter, the remaining data is printed on both sides of the sheet.

5. The method of claim 1, wherein upon detecting the delimiter, the remaining data is printed in the form of "N-up," by forming an image of plural numbers of pages on one side surface of the sheet.

6. An image formation method, comprising:
   receiving an electronic mail and an attached document thereof over a network;
   generating an image formation job including a code showing a breakpoint between a main body of the electronic mail and the attached document; and
   forming images of the main body and the attached document on separate sheets on the basis of the image formation job;
   after receiving the electronic mail, one print job is generated while decoding the received electronic mail;
   when generating the one print job, a delimiter is added in the print job; and
   when the delimiter is detected while executing the one print job, the sheet on which data is printed is changed.

7. The method of claim 6, wherein upon detecting the delimiter, the remaining data is printed on both sides of the sheet.

8. The method of claim 6, wherein upon detecting the delimiter, the remaining data is printed in the form of "N-up," by forming an image of plural numbers of pages on one side surface of the sheet.

9. An image formation method, comprising:
receiving an electronic mail and an attached document thereof over a network;
generating image formation jobs each corresponding to a main body of the electronic mail and the attached document; and
forming images of the main body and the attached document on the basis of the image formation jobs on separate sheets respectively;
after receiving the electronic mail, one print job is generated while decoding the received electronic mail;
when generating the one print job, a delimiter is added in the print job; and
when the delimiter is detected while executing the one print job, the sheet on which data is printed is changed.

10. The image formation method according to claim 1, further comprising:
determining a setting as to whether to form the image of the main body and that of the attached document on separate sheets or the same sheet;
wherein the images are formed in accordance with the setting.

11. The image formation method according to claim 10, wherein
the determining step includes determining the setting on the basis of sender identification information pertaining to the electronic mail.

12. The method of claim 9, wherein upon detecting the delimiter, the remaining data is printed on both sides of the sheet.

13. The method of claim 9, wherein upon detecting the delimiter, the remaining data is printed in the form of "N-up," by forming an image of plural numbers of pages on one side surface of the sheet.

14. An image formation method, comprising:
receiving an electronic mail and a plurality of attached documents thereof over a network;
forming each image of the attached documents to sheets separatively;
after receiving the electronic mail, one print job is generated while decoding the received electronic mail;
when generating the one print job, a delimiter is added in the print job; and
when the delimiter is detected while executing the one print job, the sheet on which data is printed is changed.

15. The method of claim 14, wherein upon detecting the delimiter, the remaining data is printed on both sides of the sheet.

16. The method of claim 14, wherein upon detecting the delimiter, the remaining data is printed in the form of "N-up," by forming an image of plural numbers of pages on one side surface of the sheet.

17. An image formation method, comprising:
receiving an electronic mail and an attached document thereof over a network;
forming images of a main body of the electronic mail and the attached document independently;
after receiving the electronic mail, one print job is generated while decoding the received electronic mail;
when generating the one print job, a delimiter is added in the print job; and
when the delimiter is detected while executing the one print job, the sheet on which data is printed is changed.

18. The image formation method according to claim 17, wherein, in the forming step, each image of the main body of the electronic mail and the attached document is formed in accordance with different image formation methods.

19. The image formation method according to claim 18, wherein the forming step includes:
forming the image of the main body of the electronic mail on both surfaces of a sheet; and
forming the image of the attached document on one surface of a sheet.

20. The image formation method according to claim 18, wherein the forming step includes:
forming an image of each page of the main body of the electronic mail at least one surface of a sheet; and
forming an image of a predetermined number of pages of the attached document on at least one surface of a sheet.

21. The image formation method according to claim 18, wherein the forming step includes:
forming an image of a predetermined number of pages of the main body of the electronic mail on at least one surface of a sheet; and
forming an image of each page of the attached document on at least one surface of a sheet.

22. The image formation method according to claim 18, wherein the forming step includes:
forming the image of the main body of the electronic mail on one surface of a sheet; and
forming the image of the attached document on both surfaces of a sheet.

23. The method of claim 17, wherein upon detecting the delimiter, the remaining data is printed on both sides of the sheet.

24. The method of claim 17, wherein upon detecting the delimiter, the remaining data is printed in the form of "N-up," by forming an image of plural numbers of pages on one side surface of the sheet.

25. An image formation apparatus, comprising:
a receive section which receives an electronic mail and an attached document thereof over a network; and
an image formation section which forms images of a main body of the electronic mail and the attached document; wherein
the images of the main body and the attached document are formed on separate sheets respectively;
after receiving the electronic mail, one print job is generated by the image formation section while decoding the received electronic mail;
when generating the one print job, a delimiter is added in the print job; and
when the delimiter is detected while executing the one print job, the sheet on which data is printed is changed.

26. The image formation apparatus according to claim 25, wherein the image formation section forms images of the main body of the electronic mail and the attached document by duplexing image formation.

27. The image formation apparatus according to claim 25, wherein the image formation section forms images of the main body of the electronic mail and the attached document while forming a predetermined number of pages as an image on at least one surface of a sheet.

28. The image formation apparatus according to claim 25, further comprising:

a setting section which determines a setting as to whether to form the image of the main body and that of the attached document on separate sheets or the same sheet;

wherein the image formation section forms the images in accordance with the setting.

29. The image formation apparatus according to claim 28, wherein the setting section determines the setting on the basis of sender identification information pertaining to the electronic mail.

30. An image formation apparatus, comprising:

a receive section which receives an electronic mail and an attached document thereof over a network;

an image formation section which forms an image of a main body of the electronic mail and the attached document; and a job generation section which produces an image formation job including a code showing a breakpoint between a main body of the electronic mail and the attached document;

wherein the image formation section forms the images of the main body and the attached document on separate sheets on the basis of the image formation job;

after receiving the electronic mail, one image formation job is generated by the job generation section while decoding the received electronic mail;

when generating the one image formation job, the breakpoint is added in the job; and when the breakpoint is detected while executing the one image formation job, the sheet on which data is printed is changed.

31. An image formation apparatus, comprising:

a receive section which receives an electronic mail and an attached document thereof over a network;

a job generation section which produces image formation jobs each corresponding to a main body of the electronic mail and the attached document; and an image formation section which forms the image of the main body and the attached document on the basis of the image formation jobs on separate sheets respectively;

after receiving the electronic mail, one image formation job is generated by the job generation section while decoding the received electronic mail;

when generating the one image formation job, a delimiter is added in the image formation job; and when the delimiter is detected while executing the one image formation job, the sheet on which data is printed is changed.

32. An image formation apparatus, comprising:

a receive section which receives an electronic mail and a plurality of attached documents thereof over a network; and an image formation section which forms each image of the plurality of the attached documents to sheets separatively;

wherein after receiving the electronic mail, one print job is generated by the image formation section while decoding the received electronic mail;

when generating the one print job, a delimiter is added in the print job; and when the delimiter is detected while executing the one print job, the sheet on which data is printed is changed.

33. An image formation apparatus, comprising:

a receive section which receives an electronic mail and an attached document thereof over a network; and an image formation section which forms images of a main body of the electronic mail and the attached document independently;

wherein after receiving the electronic mail, one print job is generated by the image formation section while decoding the received electronic mail;

when generating the one print job, a delimiter is added in the print job; and when the delimiter is detected while executing the one print job, the sheet on which data is printed is changed.

34. The image formation apparatus according to claim 23, wherein the image formation section forms each image of the main body of the electronic mail and the attached document in accordance with different image formation methods.

35. The image formation apparatus according to claim 34, wherein the image formation section forms an image of the main body of the electronic mail on both surfaces of a sheet and forms an image of the attached document on one surface of a sheet.

36. The image formation apparatus according to claim 34, wherein the image forming section forms an image of the main body of the electronic mail on both surfaces of a sheet, and forms an image of the attached document on one surface of a sheet.

37. The image formation apparatus according to claim 34, wherein the image formation section forms an image of each page of the main body of the electronic mail at least one surface of a sheet and forms an image of a predetermined number of pages of the attached document on at least one surface of a sheet.

38. The image formation apparatus according to claim 34, wherein the image formation section forms an image of a predetermined number of pages of the main body of the electronic mail on at least one surface of a sheet and forms an image of each page of the attached document on at least one surface of a sheet.

* * * * *